May 21, 1935. J. J. NOLTE 2,001,919
MEANS OF PREPARING, PACKAGING, AND SERVING FROZEN CONFECTIONS
Filed Feb. 14, 1933   2 Sheets-Sheet 1
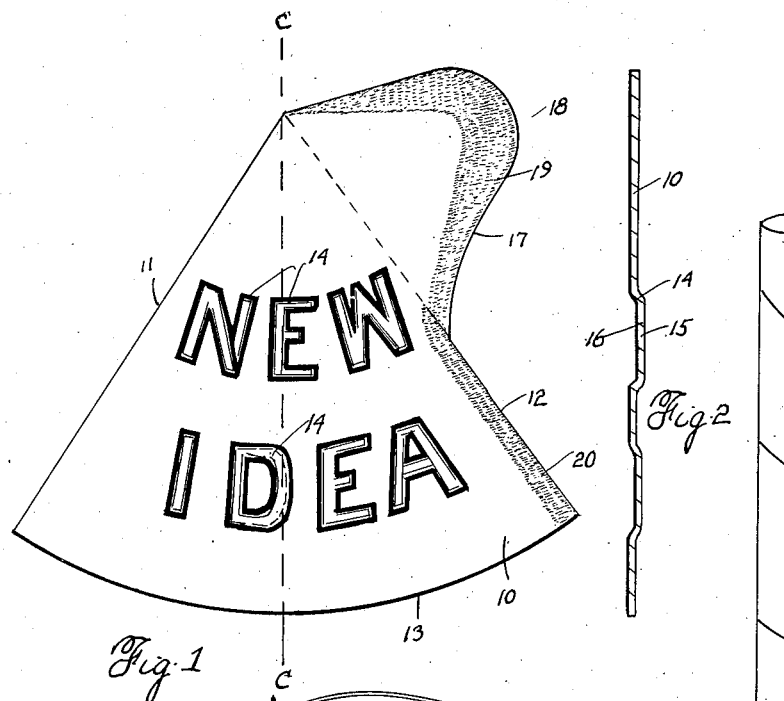
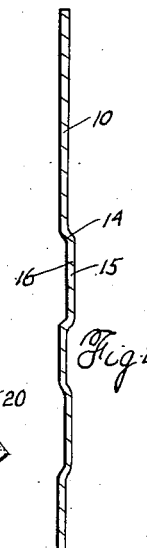
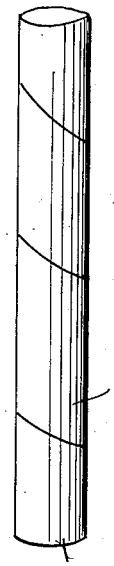
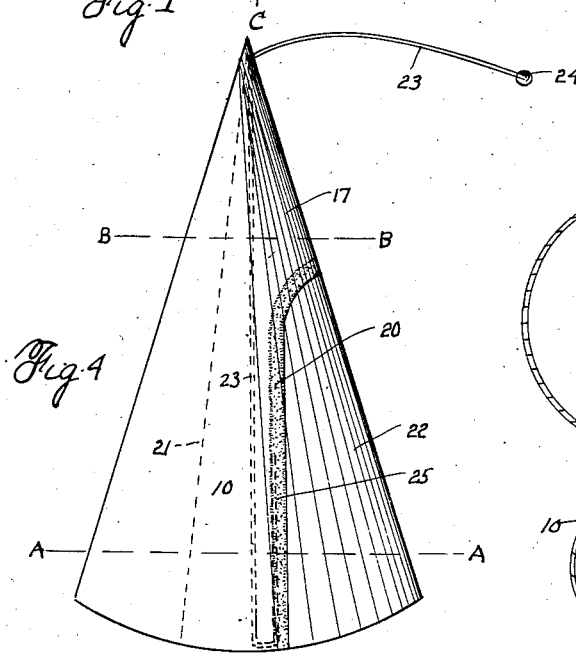
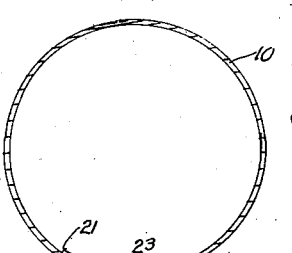
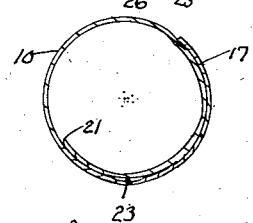

May 21, 1935.　　　　J. J. NOLTE　　　　2,001,919
MEANS OF PREPARING, PACKAGING, AND SERVING FROZEN CONFECTIONS
Filed Feb. 14, 1933　　　2 Sheets-Sheet 2
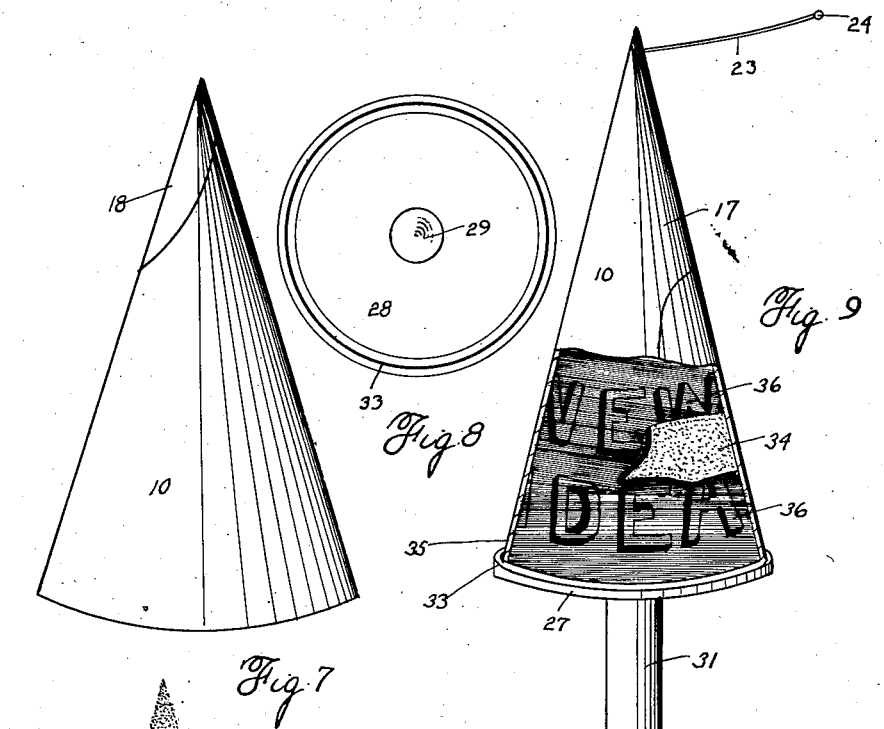
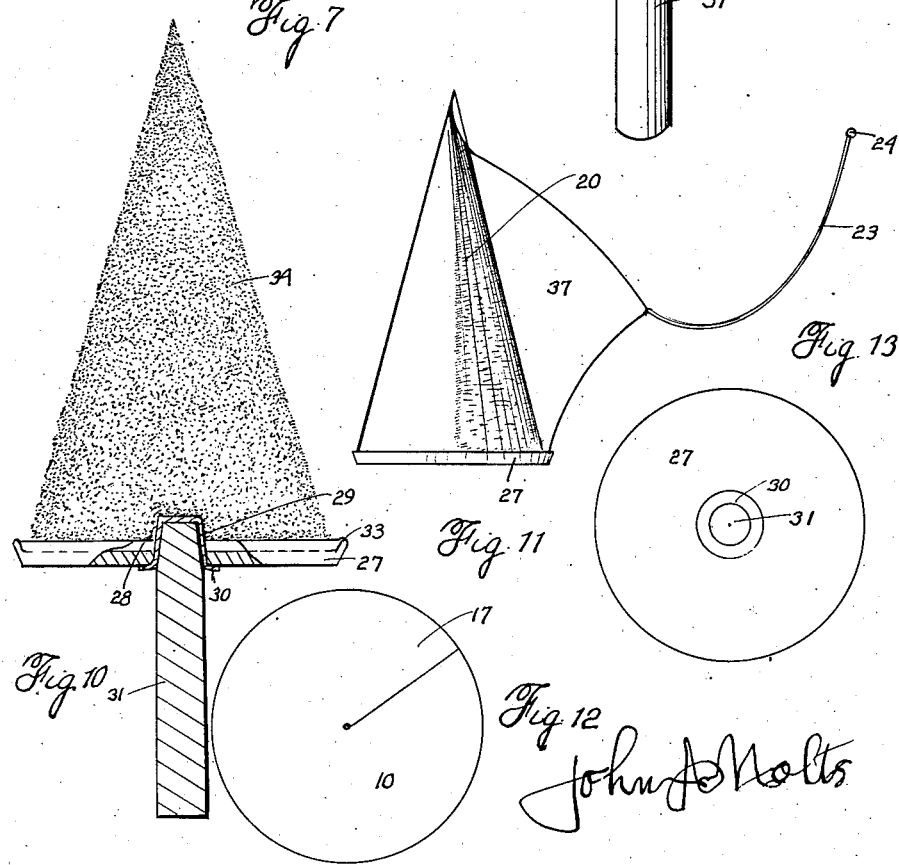

Patented May 21, 1935

2,001,919

UNITED STATES PATENT OFFICE 2,001,919

MEANS OF PREPARING, PACKAGING, AND SERVING FROZEN CONFECTIONS

John J. Nolte, Los Angeles, Calif.

Application February 14, 1933, Serial No. 656,702

8 Claims. (Cl. 206—56)

This invention relates to improvements in means for packaging and serving ice cream and similar frozen delicacies.

One of the main objects of the present invention is to provide a simple, efficient and inexpensive container for the frozen delicacy such as ice cream and the like, so shaped, constructed and designed as to facilitate the refrigeration thereof, the wrapping thereof to prevent tactual contamination, and the servicing thereof for instant use.

A further object of this invention is to provide a combination ice cream container and means providing a hand hold for the container in a manner to keep the entire contents of the container out of contact with the hand hold or handle.

A still further object of this invention is to provide a novel blank designed to be quickly and effectively shaped into a pyramidal or similarly shaped ice cream package or container, to allow for effecting the packaging of the ice cream for hardening or congealing purposes as well as for imparting to the exterior face of the insert a chocolate covering or film.

Another object of this invention is to provide the ice cream container with a closure plate and drip plate to close the base open portion of the ice cream container, and to provide a socket opening out only below the bottom of the ice cream insert, for the insertion of a stick or handle.

Another purpose of the present invention is to provide, in conjunction with the blank or wrapper for making the pyramidal container for the frozen delicacy means for embossing directly upon the ice cream insert of the finished container an advertising inscription as of the trade-mark or trade-name of the frozen product, whereby to transfer upon the insert a chocolate covering with an advertising raised inscription thereon.

A further object of this present invention is to provide, in conjunction with the pyramidal or cone-shaped package or container, means for instantly tearing off or unwrapping the package when it is desired to consume the same.

Another object of this invention is to provide a blank for packaging ice cream delicacies for the purpose of hardening the same by refrigeration, and to provide a string or cord by means of which the package may be quickly unwrapped so that the ice cream insert may become separated from the package completely, whilst resting upon the combination cap and drip plate.

Another object of the present invention consists in providing, in conjunction with an ice-cream package or container, a drip plate serviceable to close the package after the ice cream has been filled in the package, and it is desired to harden the product, which also serves to catch the drippings from the ice cream after the package has been removed from the product, a stick being designed to be inserted into the drip plate or tray in such a manner as not to come in direct contact, at any time, with the ice cream insert of the package.

A final object of the present invention is to provide a combination ice cream sales package unit for selling a determinate quantity of ice cream at a certain price, allowing the units to remain under refrigeration when not to be served, and enabling a stick to be readily connected to the closed bottom of the package when same is to be served, and the package unwrapped from the ice cream insert.

With the above and other objects in view my invention consists in the combination, arrangement and details of construction disclosed in the drawings and specification, and then more particularly pointed out in the appended claims.

In the drawings, in which similar reference characters designate similar parts throughout the respective views, Figure 1 is a top plan view of the blank used in producing the ice cream package, Figure 2 is a sectional elevation of the blank showing the surfaces for providing an embossed inscription, Figure 3 is a perspective view of a stick to be used in conjunction with my invention, Figure 4 is a perspective view of the container or package proper, Figure 5 is a cross-section taken the lower base portion of the package or container, on line A—A, Figure 6 is a cross section taken at the upper part of the container on line B—B thereof.

Figure 7 is a side elevation of my invention,

Figure 8 is a top plan view of the cap and drip plate proper,

Figure 9 is a sectional elevation of my invention showing the interior ice cream insert and chocolate layer thereon, with the embossed inscription, Figure 10 is a side elevation of my invention, partly in section showing the product when the package has been unwrapped and removed therefrom, Figure 11 is a side elevation of the package of my invention showing the manner of operation of the tearing-off or unwrapping cord, Figure 12 is a top plan view of my invention, and Figure 13 is a bottom plan view of the drip plate proper.

Referring to the drawings, which are merely illustrative of my invention I disclose the various details of construction thereof. I take and stamp out or shape a blank 10 such as is illustrated in Figure 1. Here it will be readily seen that the main outline and configuration of the blank is conical, having the oppositely inclining straight edges 11 and 12, and the preferably curved bottom edge 13 which intersects the straight inclined edges 11 and 12 respectively.

One of the main purposes of this invention, being to impress upon the ice cream insert of my package an embossed advertising inscription or legend desired, I attain this by embossing some part of the blank 19 with the desired inscription as at 14, so that one side of each letter is a raised or convex surface 15, while the opposite face of each surface is sunken in, depressed or formed concave as at 16, the parts being such that the inscription on one side of the blank is cameo and on the opposite side is formed intaglio.

The blank 10 is formed laterally with an extension or curved lip designated 17, and shaped as shown in Figure 1, and this lip provides a longitudinally reduced flap which is rounded at its outer edge as at 18. I apply an adhesive substance such as paste around the side edges and curved outer edge of the flap as shown at 19. The marginal edge of that portion of the longitudinal edge 12, of the blank, 10, which extends below the flap 17 is also provided with a line of paste 20, as shown in Figure 1.

The blank is taken and rolled and wrapped into the formation of a conical container or package, so that several laminations thereof will overlap, the flap 17 ultimately overlapping the outermost lamination of the container as shown in Figures 4 and 7 particularly. Before the blank is rolled, I contemplate securing a tearing-off or unwrapping string or cord 23 thereof, or thereto in the following manner. The string or cord is made of such a length that one length thereof extends the full length of the conical container as shown in Figure 4, where it is made into a loop and returned upwardly as at 25 a short distance to a point below the flap 17. The two lengths of the cord or string are pasted or the short length 25 may be pasted and the other length secured between two laminations of the conical container, and the free end of the cord will project laterally and beyond the conical package and may terminate in a handle or ball end 24. The outside overlap 26 is also shown.

When the blank has been rolled into a wrapped conical container, the paste will be moistened and the edges of the container secured fast against accidental unwrapping or unrolling. The main overlapping edge of the container is designated 21, and the section of the container seen exteriorly below the flap 17 and uncovered here is designated 23.

For the purpose of catching the drippings from the ice-cream contained in the package I provide an annular drip plate or tray 27 which is dished out as at 28, and is formed with a marginal rim or flange 33. I may insert operatively a thimble of metal 29 into the central part of the tray as shown in Figure 10, so as to project upwardly from the bottom of the tray, the flange 30 of the thimble being pressed back against the under face of the bottom of the tray. Or I may, if desired, upset the material of the trap or drip plate to provide a socket (not shown) closed inside of the container or package and opening downwardly for the insertion of a stick or handle 31 thereinto to seat therein with a press or friction fit. In this manner the package, after receiving its ice cream insert is closed by the drip plate and held conveniently in the hand by means of the handle or stick 31. The diameter of the drip plate being slightly larger than the base of the cone, it will be seen that an annular groove will intervene between the frozen product and the rim of the drip plate, as shown in Figure 10.

In operation the invention is practiced in the following manner. The present package for frozen delicacy is made with a view of serving the convenience of the manufacturer as well as of the merchant vending the same. In the preparation of ice cream for the trade in ice cream establishments the retailer now suffers a volume loss due to the shrinkage of "overrun" which is the result of the present method of bulky packaging of ice cream and the manner in which it is stored before served for use.

In carrying out my invention the conical container is first inverted, the confection in a semi-fluid form or cream consistency is introduced into the container, the drip plate is then closed upon the base of the conical container, so as to adhere to the sticky material making up the product, and the closed package is then bonded firmly to the base or drip plate by refrigeration, so that when the interior mass congeals and hardens the base plate will adhere to the container so that an integral device is provided. Now when the package is reversed it will be seen that the ice cream or confection insert will be supported upon the drip plate, so that now the operator may take hold of the ball end 24 of the tearing cord 23 and effect the unwrapping of the package by drawing the cord forcibly in a downward direction, which causes the pasted overlapping edge of the container to be separated from the main body of the container so the entire container is unwrapped off from the ice cream insert, leaving the insert 34 free and completely uncovered and ready for serving. However, in the act of filling the container with the ice cream the concave portions of the embossed parts of the wrapper were filled also with ice cream, and during the process of congealation has hardened. When the wrapper is removed from the insert 34 the outer surface of the insert will have raised characters 36 visible thereon. Before inserting the ice cream in the package, however, the manufacturer may spray the interior walls of the conical container with a film of chocolate, and when the container is then refregrated for a certain period of time the film hardens, and now the ice cream can be introduced into the container so as to be covered by this film; however the spray of chocolate may be immediately followed by insertion of the confection filling, after which, both chocolate and ice cream are congealed.

After congealation has been accomplished the packages are ready for distribution by the retailer to the retail trade. The merchant sells these packages in individual units, and when a customer desires to obtain one for consumption in the premises, the merchant secures a unit from his refrigerator, removes the drip plate, places the base of the conical confection on a service plate, removes the container or package by means of the tearing string, and serves in the customary manner. Should the customer want to take out one of these units, he so states and the dispenser takes a stick, inserts it into the thimble or socket and in this way the customer can hold the package of ice cream without touching the cold parts thereof, and without the stick penetrating any ice cream.

When the wrapper has been removed from contact with the ice cream container the ice cream will be contained in an outer chocolate shell 35, and the outer face of the shell will bear the raised cameo characters, as already explained.

From the foregoing it will be seen that I have provided a novel method of producing frozen confections, or keeping same intact for an indefinite interval of time without volume loss. I have brought about a new formation and shape of container and a method of transferring advertising designs upon the finished product in a very uncostly manner; and I provide a convenient manner of eating the ice cream without soiling the hands of the consumer, enabling him to obtain a full volume of the ice cream he is paying for, without appreciable loss or wastage, and I provide withal a package that can be sold in individual units to make up a pint, quart, and any measure of ice cream. I do not confine myself to the exact details of construction but claim all variations falling within the purview of the appended claims.

What I desire to claim and seek by Letters Patent is:—

1. A device as described, consisting of a paper cone, a drip plate of larger diameter than the open widest portion of said paper cone and designed to close the same and providing an annular groove around the outside face of the paper cone, a thimble in said drip plate having a closed terminal projecting into the cone and a stick detachably and frictionally anchored in said thimble.

2. A device as described consisting of a wrapped paper vessel having an intaglio inscription thereon facing towards its center, a frozen delicacy filling said vessel snugly and engaging in said intaglio inscription, and a pull string pasted into the vessel and located between the vessel and the delicacy for tearing the vessel to uncover the delicacy and for separating the portions of the delicacy from the intaglio portion of the vessel.

3. In combination a wrapped paper vessel closed at its outer end and open at its inner end, portions of said vessel being indented to provide intaglio inscription with their convex surfaces arranged externally, a frozen delicacy packed snugly into said vessel and designed to have a raised imprint upon its exterior face of said intaglio inscription, and a drip plate serving to stick to the delicacy at the open end of the vessel and for closing the latter.

4. In combination an ice cream package and serving unit open at one end and closed at another end and containing a frozen delicacy, a socket member mounted in said package and projecting into the frozen delicacy, means around said socket member and closing said package, said socket member adapted to receive and detachably hold a handle stick.

5. In combination a paper vessel rolled into conical formation and having an intaglio inscription thereon for engagement with a frozen delicacy contents of the vessel, said vessel having a longitudinally reduced terminal overlap pasted onto the main body portion of the vessel, and a string having a portion thereof wrapped internally of the vessel and a free portion for effecting the unrolling of the vessel.

6. In combination a paper vessel rolled from a wrapping and closed at one end and being open at another end, and having an embossed surface thereon, an inner coated lining on the wrapping and engaging the embossed surface thereof, a drip plate closing the vessel against which and the coated lining of the vessel a delicacy is frozen, means whereby the vessel may be manually unrolled without finger contact, and means providing a handle for the vessel.

7. In combination with an edible receptacle, closed at one end and open at another end, a drip plate of larger diameter than the widest portion of said receptacle and designed to close the same and providing an annular groove around the outside face of said vessel, a thimble in said drip plate having a closed terminal and a handle removably mounted in said thimble.

8. In combination a receptacle closed at its outer end and open at its inner end, portions of said receptacle being provided with intaglio inscription, a frozen delicacy packed therein and designed to have a raised imprint upon its exterior face of said intaglio inscription and a drip plate to stick to and to support the delicacy when the receptacle is removed.

JOHN J. NOLTE.